(12) United States Patent
Patel et al.

(10) Patent No.: US 11,690,108 B2
(45) Date of Patent: Jun. 27, 2023

(54) HIGH SPEED WIRELESS DATA COMMUNICATION TO SOLID STATE DRIVE

(71) Applicant: Lenovo Enterprise Solutions (Singapore) Pte. Ltd., Singapore (SG)

(72) Inventors: Pravin Patel, Cary, NC (US); Theodore Brian Vojnovich, Raleigh, NC (US); Luke Remis, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 533 days.

(21) Appl. No.: 15/586,167

(22) Filed: May 3, 2017

(65) Prior Publication Data

US 2018/0324873 A1 Nov. 8, 2018

(51) Int. Cl.
| | |
|---|---|
| *H04W 76/10* | (2018.01) |
| *H04L 1/20* | (2006.01) |
| *H04W 88/08* | (2009.01) |
| *H04W 84/12* | (2009.01) |
| *H04L 61/5007* | (2022.01) |

(52) U.S. Cl.
CPC .............. *H04W 76/10* (2018.02); *H04L 1/203* (2013.01); *H04L 61/5007* (2022.05); *H04W 84/12* (2013.01); *H04W 88/08* (2013.01)

(58) Field of Classification Search
CPC ...... G06F 3/0604; G06F 3/061; G06F 3/0638; G06F 3/0688; G06F 3/0659; G06F 12/0246; H04B 1/7103; H04W 76/10; H04W 84/12; H04W 88/06; H04W 52/367
USPC ................................. 370/328, 331, 335, 338
See application file for complete search history.

(56) References Cited

U.S. PATENT DOCUMENTS

| | | | |
|---|---|---|---|
| 6,894,994 B1 * | 5/2005 | Grob | H04B 1/7103 370/335 |
| 2006/0268799 A1 * | 11/2006 | Huang | H04W 88/06 370/338 |
| 2016/0062696 A1 * | 3/2016 | Cerrelli | G06F 3/0638 711/202 |
| 2017/0005909 A1 * | 1/2017 | Hunt | H04W 52/367 |
| 2017/0115932 A1 * | 4/2017 | Mitsumasu | G06F 12/0246 |

\* cited by examiner

*Primary Examiner* — Harun Chowdhury

(57) ABSTRACT

A system, according to one embodiment, includes: an enclosure, a bay coupled to the enclosure, the bay being for storing at least one solid state drive therein, and a computer coupled to the enclosure. The computer includes a central processing unit, and a wireless access point coupled to the enclosure, the wireless access point being coupled to the central processing unit. Moreover, the wireless access point is for wirelessly transferring data received from the central processing unit to at least one solid state drive stored in the bay. Other systems, methods, and computer program products are described in additional embodiments.

20 Claims, 5 Drawing Sheets

HIGH SPEED WIRELESS DATA COMMUNICATION TO SOLID STATE DRIVE

FIELD OF THE INVENTION

The present invention relates to the transfer of data between locations, and more particularly, this invention relates to providing high speed wireless transfer of data to solid state drives (SSDs).

BACKGROUND

A storage drive typically includes a high-capacity, self-contained storage device containing a read/write mechanism which has access to memory included within a sealed unit. A SSD is a solid-state type of storage drive which uses integrated circuit assemblies as memory to store data therein. SSD technology primarily uses electronic interfaces compatible with other types of storage drives.

SSDs have no moving mechanical components, which distinguishes them from traditional electromechanical magnetic disks such as hard disk drives (HDDs) or floppy disks, which contain spinning disks and movable read/write heads. Compared with electromechanical disks, SSDs are typically more resistant to physical shock, run silently, have lower access time, and lower latency.

However, protocols used in data storage drives, such as Peripheral Component Interconnect Express (PCIe) implement a high number of signals to perform a data transfer. The receiving connector is also broken out into multiple connections, which often involve forming a large number of layers on the printed circuit board (PCB). For instance, high performance SSD devices implement a PCIe bus that connects the system central processing unit (CPU) to the SSD directly. Thus, while improvements in drive performance have conventionally been achieved on a per drive basis, a net decrease in storage capability is actually occurring due to reduced density.

Previous attempts to overcome this reduction in drive density involves implementing cables and large connectors, such as a Serial attached SCSI (SAS) Cables or OCulink cable. However, these types of connections require a high number of signals per drive. This large number of signals often leads to a reduction in SSD density also, because of the bottle neck created by each connector and higher backplane cost due to increased layer complexity. The footprint of the connectors has an impact on density and often dictates how many drives can be fit in a particular system. In addition, the breakout of the connector at the backplane significantly increases the layer count of the PCB and increases the overall cost.

Thus, it would be beneficial to provide systems, methods, computer program products and the like which overcome the storage drive management shortcomings. Accordingly, the ability to reduce cabling and layout complexity specifically when designing storage backplanes is desirable.

SUMMARY

A system, according to one embodiment, includes: an enclosure, a bay coupled to the enclosure, the bay being for storing at least one solid state drive therein, and a computer coupled to the enclosure. The computer includes a central processing unit, and a wireless access point coupled to the enclosure, the wireless access point being coupled to the central processing unit. Moreover, the wireless access point is for wirelessly transferring data received from the central processing unit to at least one solid state drive stored in the bay.

A method, according to another embodiment, includes: establishing a wireless connection between a wireless access point and a solid state drive, and transferring data wirelessly from the wireless access point to the solid state drive. The wireless access point is coupled to a central processing unit, and the solid state drive is stored in a bay operable to store at least one solid state drive therein. Furthermore, the bay, the wireless access point and the central processing unit are coupled to a common enclosure.

A computer program product, according to yet another embodiment, includes: a computer readable medium having stored thereon computer readable program instructions executable by a processor of a computer system to: establish, by the processor, a wireless connection between a wireless access point and a solid state drive, and transfer, by the processor, data wirelessly from the wireless access point to the solid state drive. The wireless access point is coupled to a central processing unit, and the solid state drive is stored in a bay for storing at least one solid state drive therein. Moreover, the bay, the wireless access point and the central processing unit are coupled to a common enclosure.

Other aspects and advantages of the present invention will become apparent from the following detailed description, which, when taken in conjunction with the drawings, illustrate by way of example the principles of the invention.

DETAILED DESCRIPTION

Figure 1:
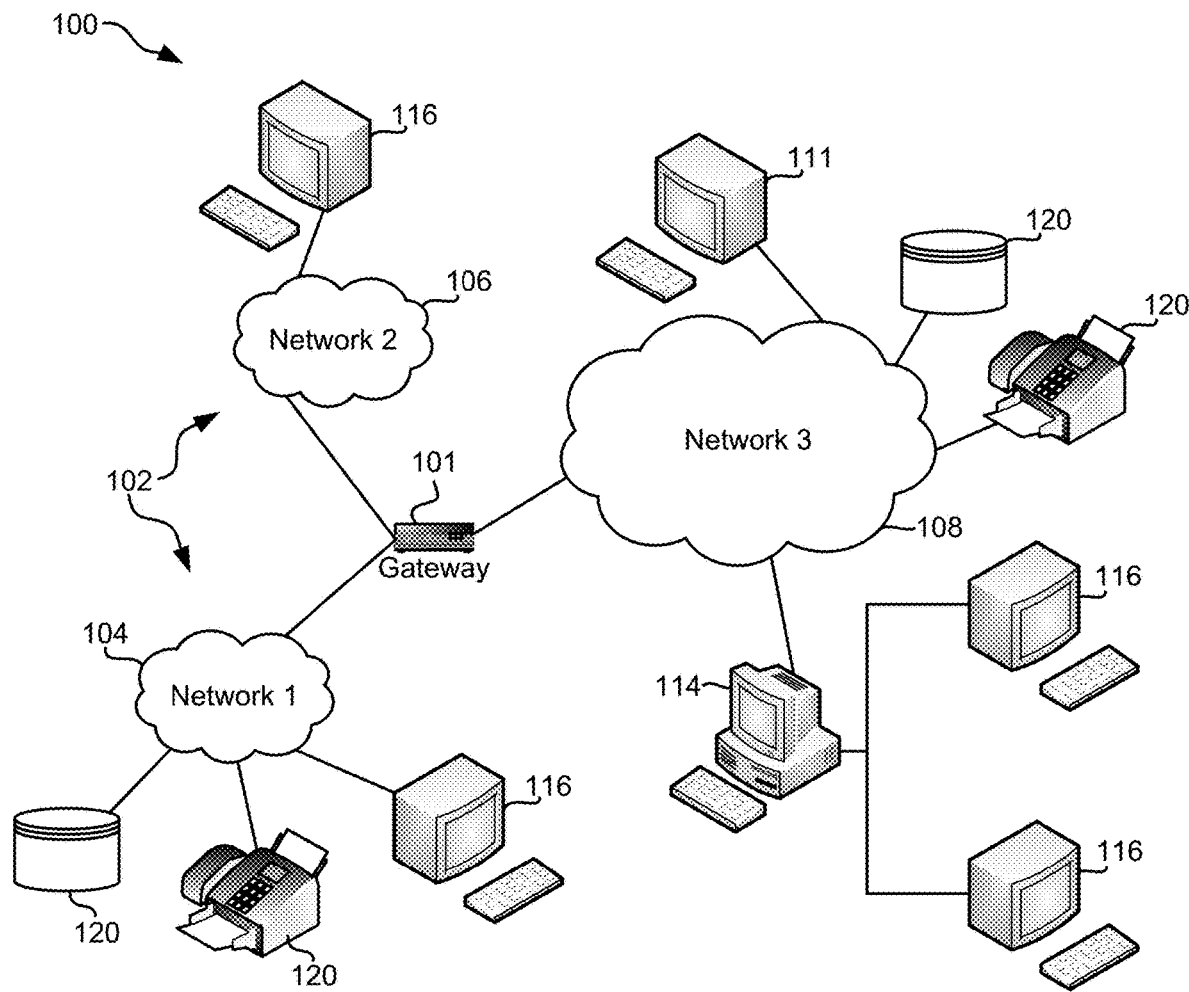
FIG. 1 is a schematic drawing of a computer network environment, according to one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of improved storage drive data transfer, and/or related systems and methods. By reducing cabling and layout complexity when designing storage backplanes, various embodiments described and/or suggested herein include systems that are able to increase drive density by implementing wireless functionality, as will be described in further detail below.

In one general embodiment, a system includes: an enclosure, a bay coupled to the enclosure, the bay being for storing at least one solid state drive therein, and a computer coupled to the enclosure. The computer includes a central processing unit, and a wireless access point coupled to the enclosure, the wireless access point being coupled to the central processing unit. Moreover, the wireless access point is for wirelessly transferring data received from the central processing unit to at least one solid state drive stored in the bay.

In another general embodiment, a method includes: establishing a wireless connection between a wireless access point and a solid state drive, and transferring data wirelessly from the wireless access point to the solid state drive. The wireless access point is coupled to a central processing unit, and the solid state drive is stored in a bay operable to store at least one solid state drive therein. Furthermore, the bay, the wireless access point and the central processing unit are coupled to a common enclosure.

In yet another general embodiment, a computer program product includes: a computer readable medium having stored thereon computer readable program instructions executable by a processor of a computer system to: establish, by the processor, a wireless connection between a wireless access point and a solid state drive, and transfer, by the processor, data wirelessly from the wireless access point to the solid state drive. The wireless access point is coupled to a central processing unit, and the solid state drive is stored in a bay for storing at least one solid state drive therein. Moreover, the bay, the wireless access point and the central processing unit are coupled to a common enclosure.

General Computing Concepts

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, and data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
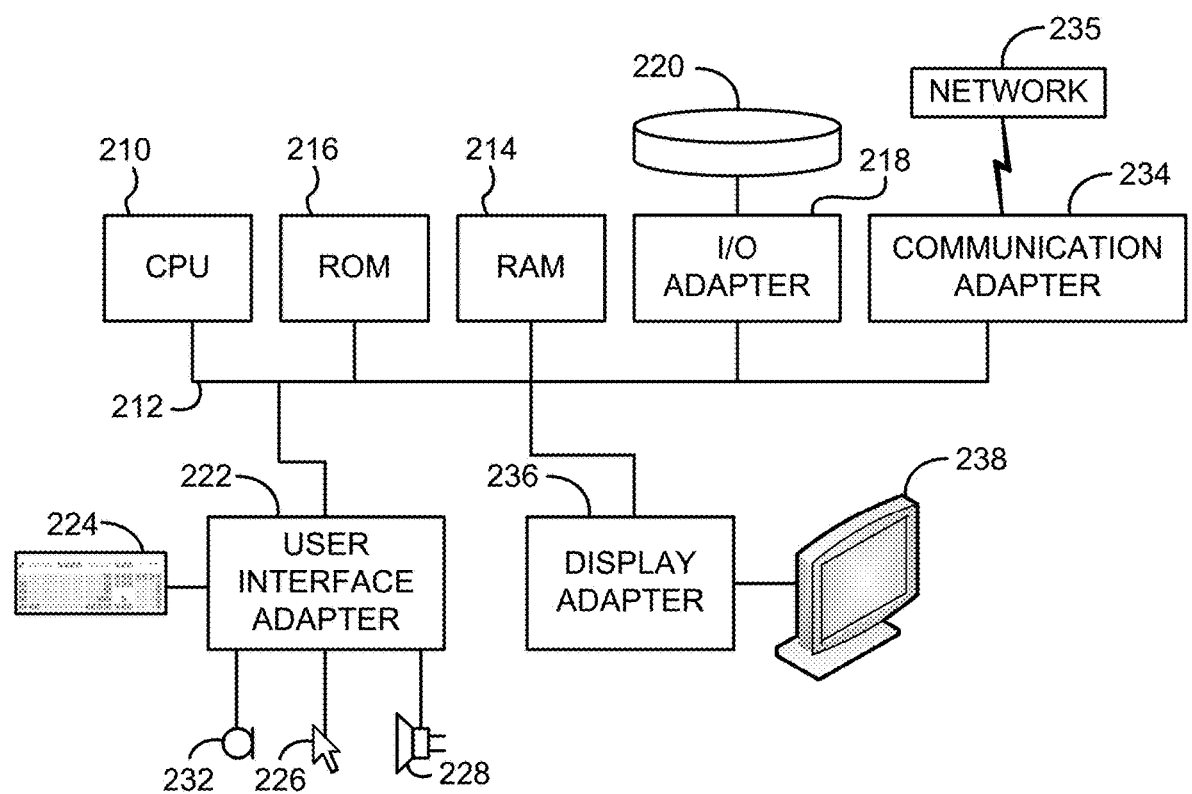
FIG. 2 is a simplified schematic of a computing workstation, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Moreover, a system according to various embodiments may include a processor and logic integrated with and/or executable by the processor, the logic being for performing one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and operable to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

As previously mentioned, protocols used in data storage drives, such as Peripheral PCIe implement a high number of signals to perform a data transfer. The receiving connector is also expanded into multiple connections, which often involve forming a large number of layers on the PCB. For instance, high performance SSD devices implement a PCIe bus that connects the system CPU to the SSD directly. Thus, while improvements in drive performance have conventionally been achieved on a per drive basis, a net decrease in storage capability may actually occur due to reduced density.

Previous attempts to overcome this reduction in drive density have involved implementing cables and large connectors, such as a SAS Cables or OCulink cables. However, these types of connections require a high number of signals per drive. The large number of signals often leads to a reduction in SSD density also, because of the bottleneck created by each connector and higher backplane cost due to increased layer complexity. The footprint of the connectors has an impact on density and often dictates how many drives can be fit in a particular system. In addition, the breakout of the connector at the backplane significantly increases the layer count of the PCB and increases the overall cost.

Thus, it would be beneficial to provide systems, methods, computer program products and the like which overcome conventional storage drive management shortcomings. Accordingly, the ability to reduce cabling and layout complexity specifically when designing storage backplanes is desirable. Various embodiments described and/or suggested herein include systems that are able to increase drive density by implementing wireless functionality, as will be described in further detail below.

Figure 3:
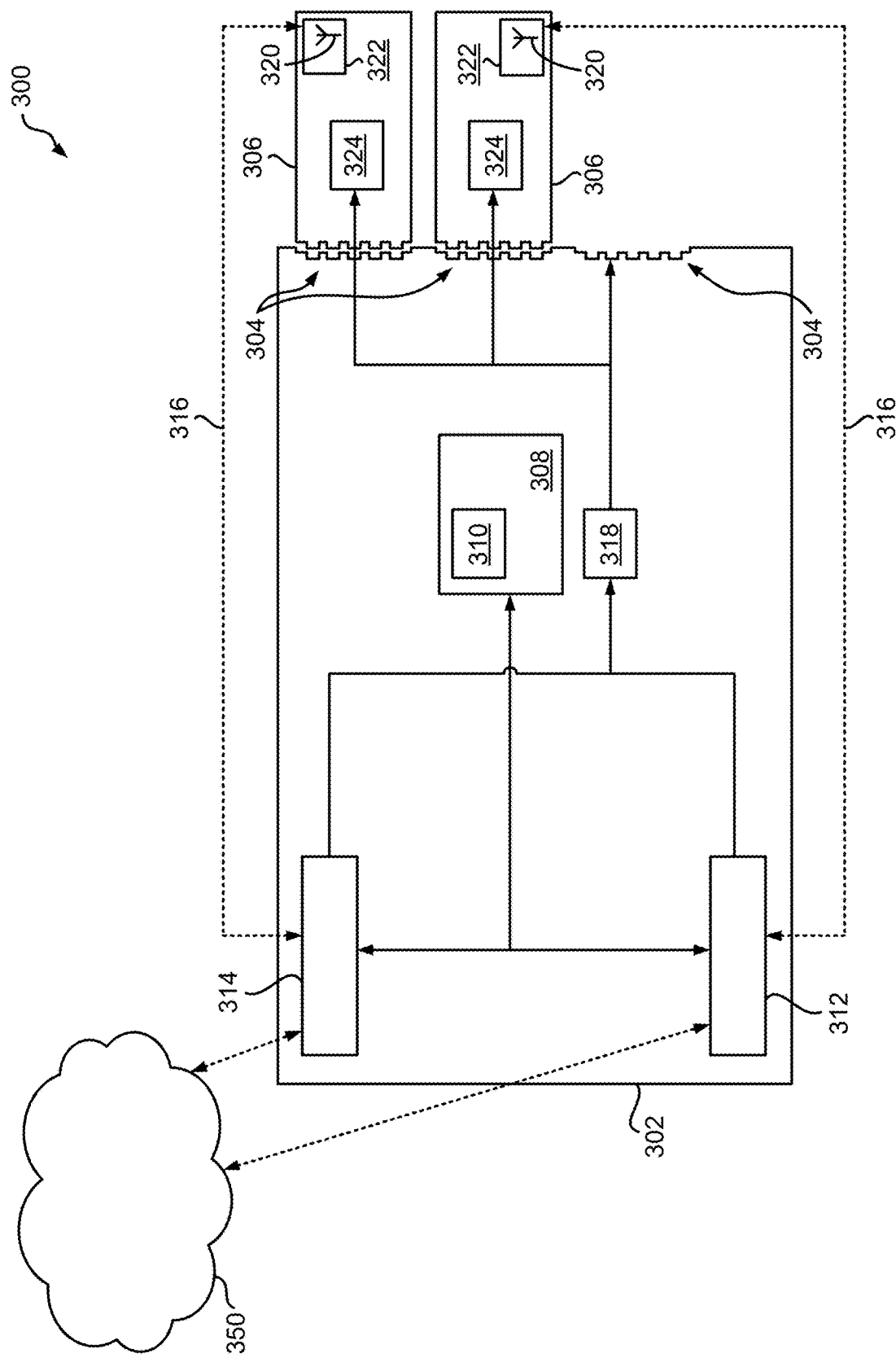
FIG. 3 is simplified schematic view of a computer system, according to one embodiment.

Looking to FIG. 3, a system 300 is illustrated in accordance with one embodiment. As an option, the present system 300 may be implemented in conjunction with features from any other embodiment listed herein, such as those described with reference to the other FIGS., such as FIGS. 1-2. However, such system 300 and others presented herein may be used in various applications and/or in permutations which may or may not be specifically described in the illustrative embodiments listed herein. Further, the system 300 presented herein may be used in any desired environment. Thus FIG. 3 (and the other FIGS.) may be deemed to include any possible permutation.

As shown, system 300 includes an enclosure 302 and at least one bay 304 which is coupled to the enclosure 302. It should be noted that various components may be coupled to the enclosure using any number of techniques. According to different approaches, any of the components described herein as being "coupled to the enclosure 302" may be coupled thereto using fasteners, mounts, adhesives, bonding processes (e.g., soldering, welding, fusing, etc.), straps, friction (e.g., slots), etc.

Each of the bays 304 is preferably for storing at least one storage drive (e.g., SSD) therein. Accordingly, embodiments having more than one bay 304 may be able to couple more than one storage drive (e.g., multiple drives) to the enclosure 302. The embodiment illustrated in FIG. 3 includes two SSDs 306 which are coupled to the enclosure 302 via bays 304. Depending on the approach, bays 304 may include physical connection ports (e.g., interface connectors) of a type known in the art. It should also be noted that although the SSDs 306 and enclosure 302 are illustrated in the present embodiment as having a small separation therebetween at the respective bays 304, the SSDs 306 and enclosure 302 may be physically coupled together by engaging a receiving edge of each of the SSDs 306 with a respective bay 304. However, a physical electrical connection between the SSDs 306 and the enclosure 302 may be formed by a cable, a wire, a physical network connection (e.g., an Ethernet cable), etc., in other approaches.

Although only two SSDs 306 are coupled to the enclosure 302, a third bay 304 may be available to receive a third SSD (not shown). Accordingly, removal and/or replacement of certain SSDs may be implemented during the lifetime of the system 300 as would be appreciated by one skilled in the art upon reading the present description.

Figure 5:
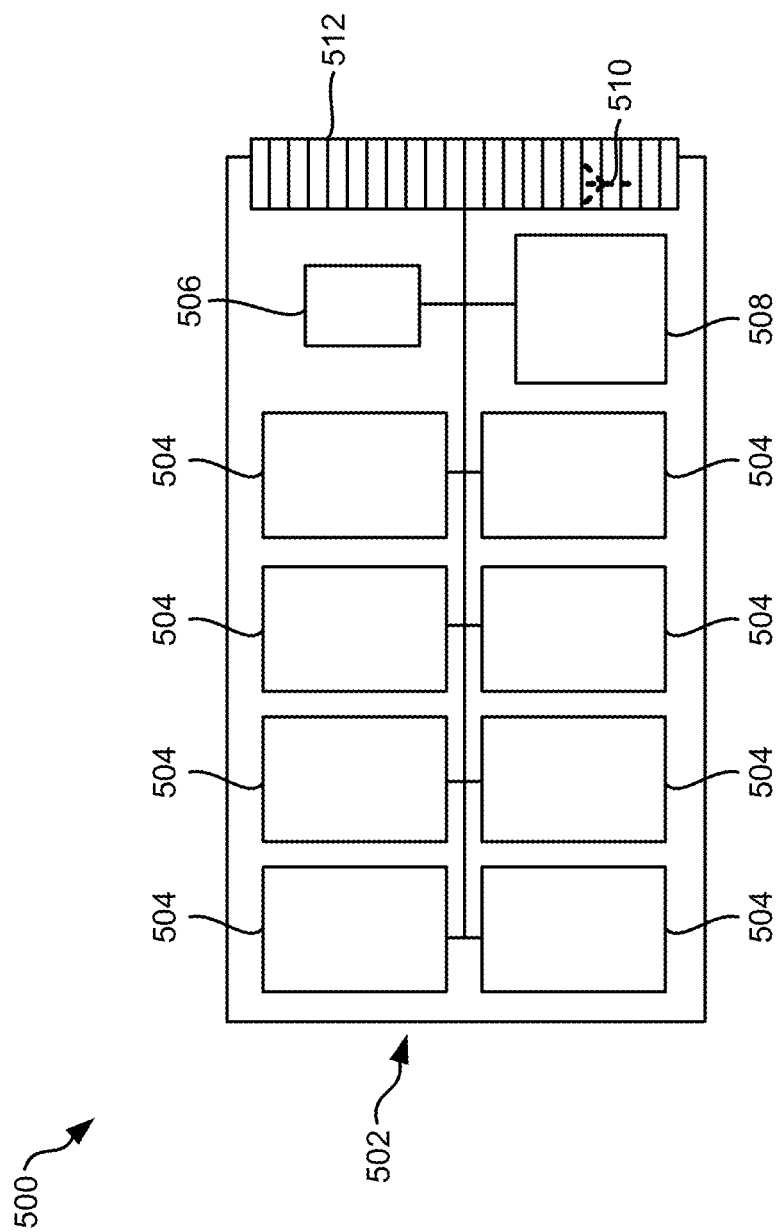
FIG. 5 is a partial schematic view of a storage drive tray, according to one embodiment.

Looking momentarily to FIG. 5, a detailed schematic view of a SSD storage drive tray 500 is illustrated in accordance with one embodiment, which is in no way intended to limit the invention. As shown, SSD storage drive tray 500 includes a logic board 502 which includes a plurality of non-volatile memory chips 504 (e.g., comprising NAND). Moreover, a cache 506 and controller 508 are included. According to the present embodiment, wireless receiver 510 is positioned beneath an interface connector 512 which may be used to couple the SSD storage drive tray 500 to a bay (e.g., an interface connector) of a system enclosure (e.g., see 304 of FIG. 3). In some approaches, the wireless receiver 510 may be used to convert received wireless signals to a Serial Attached Small Computer System Interface (SAS) protocol, a Serial Advanced Technology Attachment (SATA), a Non-Volatile Memory Express (NVME) protocol, a PCIe protocol, etc., as would be appreciated by one skilled in the art upon reading the present description. However, in other approaches, the wireless receiver 510 may be positioned differently on the SSD storage drive tray 500. Wireless receiver 510 may be used to form the wireless connection between the SSD and a wireless access point, as will soon become apparent. In some approaches an SSD storage drive tray 500 may include an integrated circuit (not shown) with wireless functionality and which is able to write data to the non-volatile memory chips 504 themselves.

Referring back to FIG. 3, a computer 308 and basepoint management controller 318 are also coupled to the enclosure 302. The computer 308 is illustrated as including a CPU 310, and in various other approaches, the computer 308 may include any other computing components which would be apparent to one skilled in the art upon reading the present description, e.g., such as a processor and logic (hardware and/or software) for performing operations of a method.

Further still, system 300 includes a first wireless access point 312 and a second wireless access point 314, both of which are coupled to the enclosure 302. In preferred approaches, the wireless access points 312, 314 are each coupled to the CPU 310 via a physical electrical connection, e.g., such as a cable, a wire, a bus, a printed circuit, etc. Accordingly, each of the wireless access points 312, 314 may receive data, instructions, requests, commands, etc., from the CPU 310 directly. According to an illustrative approach, the wireless access points 312, 314 may be PCIe devices, e.g., as would be appreciated by one skilled in the art upon reading the present description. In some approaches, the wireless access points 312, 314 may each include a respective storage bridge, e.g., as would be appreciated by one skilled in the art upon reading the present description.

Moreover, it should be noted that the number of wireless access points included in the present embodiment is in no way intended to be limiting, but rather is presented by way of example only. In other embodiments, a system may include only one wireless access point, at least three wireless access points, multiple wireless access points, etc. In some approaches, the number of wireless access points may correspond to the number of bays included in the enclosure, e.g., in order to maintain a unique wireless connection between each of the wireless access points and a respective SSD, as will soon become apparent.

As described above, some of the embodiments described herein are beneficial by providing systems, methods, computer program products and the like which are able to reduce cabling and layout complexity specifically when designing storage backplanes by implementing systems that are able to increase drive density by implementing wireless functionality. Accordingly, the wireless access points 312, 314 preferably establish a wireless connection with each of the SSDs 306 coupled to the enclosure 302 of the system 300, as indicated by dashed lines 316. Wireless connections therebetween may be facilitated by an antenna at each of the wireless access points 312, 314 (not shown), as would be appreciated by one skilled in the art upon reading the present description. Moreover, each of the wireless access points 312, 314 are preferably operable to wirelessly transfer data received from the CPU 310 to one or more SSDs 306 that are positioned in the bay(s) 304. Accordingly, each of the wireless access points 312, 314 may be operable to receive data from the computer 308, or a component thereof (e.g., CPU 310), via a physical electrical connection, and wirelessly transfer that data to one or more of the SSDs 306 when appropriate via a wireless connection with the respective SSD.

However, it should be noted that in other embodiments, the computer 308, or a component thereof (e.g., CPU 310) may be able to establish a wireless connection with one or more of the SSDs 306 stored in the bays 304. According to an example, a mobile device processor having wireless functionality (capability) may be implemented in the computer 308 of system 300, whereby the mobile device processor may be used to establish wireless connections with one or more of the SSDs 306 and facilitate the transfer of data therebetween.

With continued reference to FIG. 3, it is preferred that the data is wirelessly transferred from any of the wireless access points 312, 314 to at least one SSD 306 stored in a bay 304 without using a physical connection that connects any of the wireless access points 312, 314 and the at least one SSD 306, e.g., such as a wire, bus, cable, etc. In other words, it is preferred that data communication between the CPU 310 and any one or more of the SSDs 306 is only performable via one or more of the wireless access points 312, 314. Thus, regardless of whether any physical electrical connections extend from the CPU 310 and/or any of the wireless access points 312, 314 to any of the SSDs 306 coupled to the enclosure 302, data is preferably only able to be wirelessly transferred between the CPU 310 and the SSDs 306 by implementing the wireless connection between any of the wireless access points 312, 314 and the SSDs 306. For instance, the computer 308 and the SSDs 306 positioned in the bays 304 may be powered by a common power source in some approaches, yet all transferring of data therebetween is only done via the wireless connections.

It follows that the wireless access points 312, 314 are preferably used to approximately evenly balance the data transfer load to each of the respective SSDs 306 currently coupled to the enclosure 302. In some approaches, each of the wireless access points 312, 314 may be wirelessly connected to a respective SSD 306 currently coupled to the enclosure 302. In other words, a one-to-one ratio between wireless access points and SSDs may be maintained in order to help balance the system load evenly across the wireless access points available. However, in some approaches a given one of the wireless access points 312, 314 may be wirelessly connected to more than one SSD 306, e.g., depending on the amount of data being transferred therebetween, the number of SSDs 306 coupled to the system 300, the number of wireless access points 312, 314 that are available at that point in time, etc. For example, if a third SSD is coupled to the enclosure 302, a wireless connection between the third SSD and wireless access point 312 may be established, despite the fact that wireless access point 312 is already wirelessly connected to another SSD in the present embodiment.

In some embodiments, one of the wireless access points 312 or 314 may be used to establish and maintain a wireless connection with each of the SSDs 306 coupled to the enclosure 302, while the other of the wireless access points 312, 314 is reserved as a backup to be used if a failure occurs. The wireless access points 312, 314 may establish a wireless connection with any of the SSDs 306 by performing the steps of a predetermined procedure (e.g., see method 400 below). Moreover, according to various approaches, one or more wireless connections may be established between the wireless access points 312, 314 and SSDs 306 using any desired protocol, e.g., including Bluetooth, near field communication (NFC), WiFi Direct, WiFi, etc. Thus, according to an illustrative approach which is in no way intended to limit the invention, the wireless access points 312, 314 may be operable to wirelessly transfer data directly to at least one SSD 306 stored in a bay 304 using WiFi.

It should also be noted that either of the wireless access points 312, 314 may additionally be wirelessly connected to a wireless network 350. Network 350 may be a wireless personal area network (WPAN), a LAN, a WAN, a global area network (GAN), etc., or any other type of wireless network. In addition, various combinations of wired, wireless (e.g., radio frequency) and optical communication links may be utilized to form the overall network 350. Thus, network 350 may be electrically coupled to various other components of system 300 and/or other systems physically separated therefrom.

With continued reference to FIG. 3, each of the wireless access points 312, 314 may have respective static Internet protocol addresses. Accordingly, a wireless connection between a SSD 306 and either of the wireless access points 312, 314 may be established using a respective static Internet protocol address, as would be appreciated by one skilled in the art upon reading the present description. In one approach, a wireless antenna 320 of a wireless controller 322 in either of the SSDs 306 may be used to establish a wireless connection with either of the wireless access points 312, 314 by using the static Internet protocol address thereof. The static Internet protocol addresses may be assigned to each of the wireless access points 312, 314 by the basepoint management controller 318, e.g., each time the system 300 is powered on. Moreover, the basepoint management controller 318 may manage the static Internet protocol addresses over time. For example, the basepoint management controller 318 may assign a new static Internet protocol address to one of the wireless access points 312, 314 in response to the wireless access point failing and being replaced, reprogrammed, updated, etc. However, it should be noted that Internet protocol addresses may be assigned to each of the wireless access points 312, 314 and/or managed according to any other desired embodiment which would be apparent to one skilled in the art upon reading the present description, e.g., by using computer 308.

Although data transfer from the CPU 310 to the SSDs 306 is limited to the wireless connection between the SSDs 306 and wireless access points 312, 314 in preferred embodiments, the basepoint management controller 318 is electrically coupled to the wireless access points 312, 314 as well as the SSDs 306. Thus, the basepoint management controller 318 includes a physical electrical connection for communicating with at least one of the SSDs 306. Accordingly, the basepoint management controller 318 may be operable to perform any number of processes for managing the wireless connection between the wireless access points 312, 314 and the SSDs 306, respectively. In one approach, the basepoint management controller 318 may be able to communicate with the computer 308 and/or a processor 324 on the SSDs 306 (e.g., see controller chip 508 of FIG. 5). However, it should be noted that the basepoint management controller 318 is not able to actually transfer data between the wireless access points 312, 314 and the SSDs 306.

Figure 4:
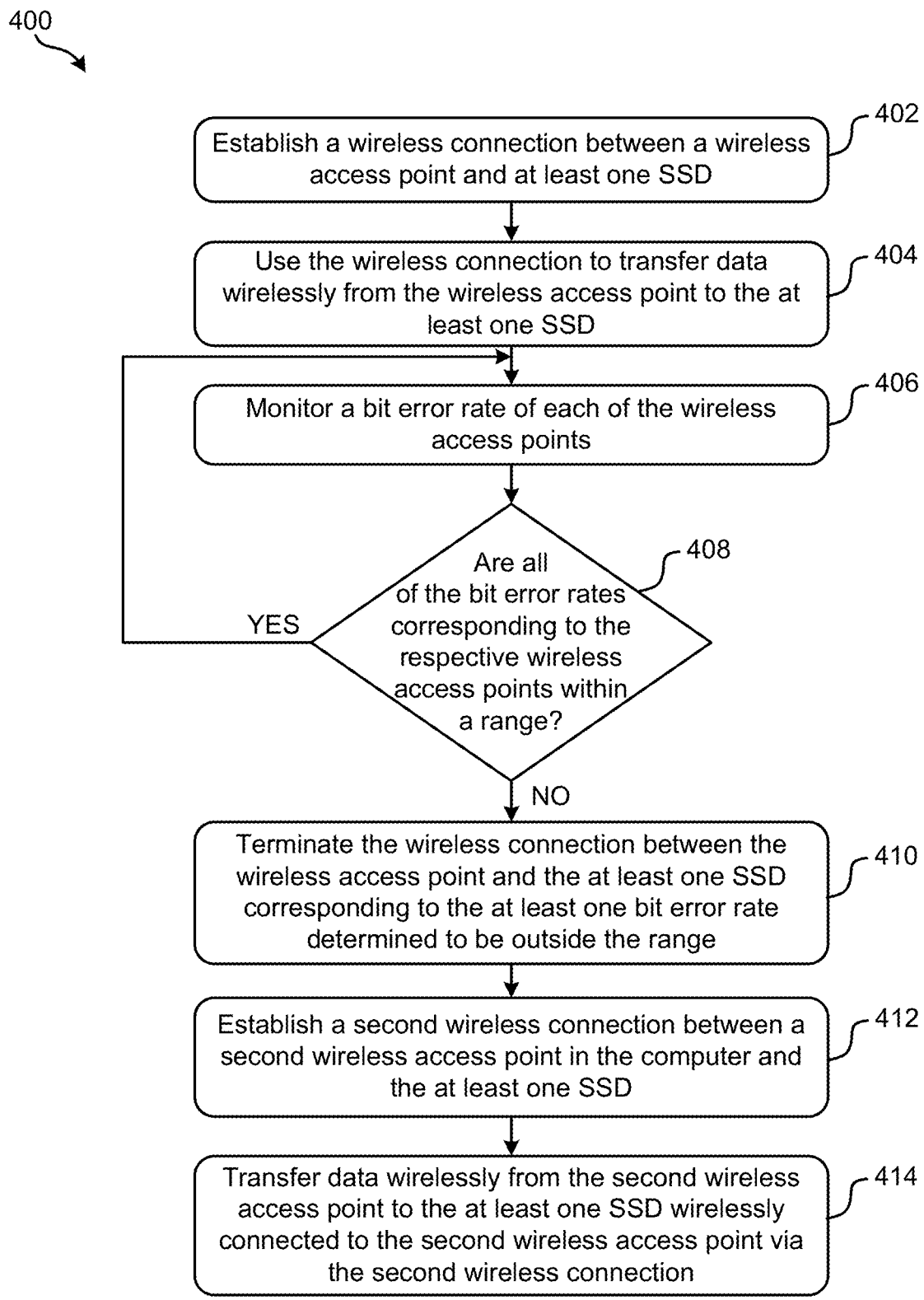
FIG. 4 is a flowchart of a method, according to one embodiment.

Looking to FIG. 4, a flowchart of a method 400 for establishing, monitoring and updating at least one wireless connection between a wireless access point and a SSD is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a CPU, an application specific integrated circuit (ASIC), a field programmable gate array (FPGA), etc., combinations thereof, or any other suitable computing device known in the art.

As shown in FIG. 4, operation 402 includes establishing a wireless connection between a wireless access point and at least one SSD. As previously mentioned, a wireless connection may be established between the wireless access point and at least one SSD using any desired protocol, e.g., including Bluetooth, near field communication (NFC), WiFi Direct, WiFi, etc. The at least one SSD may be stored in a bay which is stores at least one SSD therein. Moreover, the wireless access point is preferably coupled to a CPU, where the bay, the wireless access point and the CPU are coupled to a common enclosure (e.g., as shown in FIG. 3). Once a wireless connection has been established between a wireless access point and at least one SSD, the CPU effectively has wireless capability to communicate with the at least one SSD.

Moreover, operation 404 includes using the wireless connection to transfer data wirelessly from the wireless access point to the at least one SSD. Depending on how many SSDs are wirelessly connected to a given wireless access point (or vise-versa), operation 404 may include additional sub-processes to determine the desired data transfer path. In other words, transferring data wirelessly between wireless access point(s) and SSD(s) may include one or more additional processes to determine which wireless access point to transfer the data from and/or which SSD to transfer the data to.

However, it should be noted that while the wireless access point is preferably operable to wirelessly transfer data received from the central processing unit to a SSD stored in the bay, data communication between the central processing unit and the SSD is only performable via the wireless access point. Thus, although a SSD and a wireless access point may be coupled to each other via a physical electrical connection (e.g., a wire, bus, cable, etc.), data may not be transferred therebetween via any such physical electrical connection.

Operation 406 of method 400 includes monitoring a bit error rate of each of the wireless access points. As data is transferred from each of the wireless access points to a respective SSD via a wireless connection therebetween, the bit error rate corresponding to the transfer of data may provide an accurate representation of the quality and efficiency of the wireless connection. Thus, by monitoring the bit error rate corresponding to each wireless access point, the basepoint management controller may be able to determine whether each of the wireless connections between the wireless access points and SSDs should be reestablished. It should also be noted that the response time across the wireless connection between a wireless access point and the one or more corresponding SSDs may be monitored. According to an example, a wireless connection may be terminated in response to the storage bridge of a wireless access point not responding (e.g., sending data to the one or more SSDs) within a predetermined amount of time, e.g., as would be appreciated by one skilled in the art upon reading the present description. Moreover, the one or more SSDs may be wirelessly connected to a different wireless access point via a subsequently established wireless connection as soon become apparent.

Accordingly, decision 408 includes determining whether all of the bit error rates corresponding to the respective wireless access points are in a range, such as above or below a predefined value, between values, etc. The range may be predetermined by a user, calculated in real time, updated at a given frequency (every period), vary depending on the data being transferred, be based on the SSD and/or wireless access point, etc., depending on the desired embodiment. It should be noted that "in a range" is in no way intended to limit the invention. Rather than determining whether a value is in a range, equivalent determinations may be made, e.g., whether a value is outside a predetermined range, whether an absolute value is above a threshold, whether a value is below a threshold, etc., depending on the desired approach.

Referring still to FIG. 4, method 400 returns to operation 406 in response to determining that all of the bit error rates corresponding to the respective wireless access points are in the range, whereby method 400 may continue to monitor the bit error rate of each of the wireless access points. In preferred approaches, decision 408 is performed in parallel with operation 406. In other words, it is preferred that decision 408 is performed to determine if any of the bit error rates are no longer in the range as soon as it happens (e.g., about instantaneously). However, in other approaches decision 408 may be performed after a certain amount of time has passed, in response to a certain amount of data being transferred, upon request, periodically, etc.

Method 400 proceeds from decision 408 to operation 410 in response to determining that the bit error rate corresponding to any of the wireless access points is no longer in the range. There, operation 410 includes terminating the wireless connection between the wireless access point and the at least one SSD corresponding to the at least one bit error rate determined to be outside the range.

Depending on when a wireless connection between a wireless access point and a SSD is terminated, there may still be data that has not yet been transferred to the SSD. The data to be transferred to at least one SSD stored in a bay of the system may be stored in memory. In some approaches one or more of the wireless access points may include memory operable to store data to be transferred to at least one SSD stored in a bay of the system. Thus, unsent data may be stored at the wireless access point itself. The memory may be implemented and used to actually store such unsent data in response to the wireless connection being terminated (e.g., as seen in operation 410), preferably such that the data may be retained until another wireless connection may be established, or the data is rerouted to a different wireless access point. However, the memory in the wireless access points may be used in other desired ways as well. According to one example, the memory in each of the wireless access points may be used to buffer data received from the computer before it is sent to the respective SSD.

Referring still to FIG. 4, method 400 further includes establishing a second wireless connection between a second wireless access point in the computer and the at least one SSD. See operation 412. However, it should be noted that if more than one wireless connection is terminated in operation 410 (e.g., corresponding to more than one of the bit error rates being determined to be outside the range), operation 412 may include establishing a new wireless connection between each of the wireless access points corresponding to the terminated wireless connections and the respective SSDs. In other words, operation 412 may include establishing more than simply "a second wireless connection", e.g., depending on the number of wireless connections terminated in operation 410, and is therefore in no way intended to limit the invention.

The wireless connection(s) established in operation 412 (e.g., the second wireless connection) may be established using any desired protocol, e.g., Bluetooth, near field communication (NFC), WiFi Direct, WiFi, etc. Moreover, as alluded to above, the second wireless connection may be established using a basepoint management controller.

Although it is preferred that a new wireless connection is established each time it is determined that the bit error rate corresponding to an existing wireless connection is outside the range, in some approaches, the existing wireless connection may be terminated without subsequently establishing a new wireless connection. For example, an undesirably high bit error rate may be the result of a failing (poorly performing) wireless access point, in which case a newly established wireless connection may retain a similarly high bit error rate. Thus, the wireless access point may first be replaced before any additional wireless connections are established using that access point. However, it is preferred that at least one wireless connection between a wireless access point and a SSD is maintained.

In other approaches, rather than establishing a new wireless connection between a wireless access point and a given SSD following the termination of an existing wireless connection therebetween, the given SSD may simply be wirelessly connected (wirelessly reassigned) to a different wireless access point using a different existing wireless connection which has a bit error rate in the range.

With continued reference to FIG. 4, operation 414 includes transferring data wirelessly from the second wireless access point to the at least one SSD wirelessly connected to the second wireless access point via the second wireless connection. Once the second wireless connection has been established, it may be used to transfer data wirelessly. In some approaches, any data stored in memory at the second wireless access point may first be transferred to the at least one SSD wirelessly connected thereto, after which additional data received by the second wireless access point from a computer (e.g., CPU) may be transferred to the at least on SSD via the second wireless connection.

As a result, FIG. 4 includes a method 400 for wirelessly transferring data from a CPU to at least one SSD storage device coupled to a server chassis. Moreover, a plurality of SSDs may be initiated to a wireless access point device which may contain a unique address for the SSDs according to some of the approaches described above. Accordingly, the one or more SSDs may be aware of which wireless access point they are assigned to, and corrective steps may be taken in response to determining that a connected SSD device begins to fail (e.g., stops responding).

Moreover, approaches described herein are able to detect the wireless access point capabilities and/or performance which may be used when reassigning one or more SSDs to a different wireless access point. Furthermore, a wireless access point storage bridge may contain non-volatile memory to cache transaction between the CPU and the SSD(s) wirelessly connected to the given wireless access point. This is useful should the wireless connection fail, whereby the data to be transferred to the SSD(s) is preferably buffered so it is not lost.

It follows that various embodiments described herein may provide an improved process of managing the transfer of data between a system and storage drives coupled thereto, e.g., such as enterprise class SSDs, over conventional implementations which transfer data over physical electrical (e.g., wired) connections. Again, any of the processes herein may be implemented in order to establish, monitor and/or update a wireless connection between an electrical device (e.g., a wireless access point, CPU, etc.) and a storage drive, preferably such that the wireless connection may be used to wirelessly transfer data the storage drive. As a result, the ability to reduce cabling and layout complexity, specifically when designing storage backplanes, is achievable by implementing different ones of the embodiments described and/or suggested herein. Accordingly, various embodiments included herein provide systems that are able to increase the number of storage drives that may be coupled to a given system at a given time by implementing wireless functionality. In other words, some of the embodiments included herein are able to reduce the impact that large connectors have on a highly dense storage backplane environments, without sacrificing performance.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   an enclosure, wherein the enclosure comprises a bay, the bay being configured to store a solid state drive therein;
   a computer physically coupled to the enclosure, the computer comprising a central processing unit; and
   a wireless access point physically coupled to the enclosure, the wireless access point being physically electrically coupled to the central processing unit,
   wherein the wireless access point is configured to wirelessly transfer data received from the central processing unit directly to a solid state drive controller within the solid state drive stored in the bay via a direct wireless connection between the wireless access point and the solid state drive.

2. The system as recited in claim 1, wherein the wireless access point has a static Internet protocol address.

3. The system as recited in claim 1, wherein the wireless access point is operable to transfer the data received from the central processing unit to the solid state drive without using a physical connection that connects the wireless access point and the solid state drive.

4. The system as recited in claim 1, comprising a controller operatively electrically coupled to the wireless access point, wherein the controller includes a physical electrical connection configured to communicate with the solid state drive.

5. The system as recited in claim 4, wherein the controller is operable to:
   monitor a bit error rate of the wireless access point;
   establish a second wireless connection between a second wireless access point in the computer and the solid state drive in response to determining that the bit error rate of the wireless access point is in a range; and
   transfer data wirelessly from the second wireless access point to the solid state drive.

6. The system as recited in claim 1, further comprising memory configured to store data to be transferred to the at least one solid state drive.

7. The system as recited in claim 1, wherein the wireless access point is operable to wirelessly transfer data directly to the solid state drive using WiFi.

8. The system as recited in claim 1, wherein the wireless access point is operable to wirelessly transfer data to two or more solid state drives stored in the bay, wherein data communication between the central processing unit and the two or more solid state drives is only performable via the wireless access point.

9. A method, comprising:
   establishing a direct wireless connection between a wireless access point and a solid state drive; and
   transferring data wirelessly from the wireless access point directly to a solid state drive controller within the solid state drive via the direct wireless connection between the wireless access point and the solid state drive,
   wherein the wireless access point is physically electrically coupled to a central processing unit, wherein the solid state drive is stored in a bay,
wherein the wireless access point and the central processing unit are physically coupled to a common enclosure, wherein the enclosure comprises the bay.

10. The method as recited in claim 9, wherein the wireless access point has a static Internet protocol address.

11. The method as recited in claim 9, wherein the data received from the central processing unit is transferred by the wireless access point to the solid state drive stored in the bay without using a physical connection that connects the wireless access point and the solid state drive.

12. The method as recited in claim 9, wherein a controller is physically electrically coupled to the wireless access point, wherein the controller includes a physical electrical connection configured to communicate with the solid state drive.

13. The method as recited in claim 9, comprising:
monitoring a bit error rate of the wireless access point;
establishing a second wireless connection between a second wireless access point and the solid state drive in response to determining that the bit error rate of the wireless access point is in a range; and
transferring data wirelessly from the second wireless access point to the solid state drive.

14. The method as recited in claim 9, further comprising memory configured to store data to be transferred to the solid state drive.

15. The method as recited in claim 9, wherein the wireless access point wirelessly transfers data directly to the solid state drive stored in the bay using WiFi.

16. The method as recited in claim 9, wherein the wireless access point wirelessly transfers data to two or more solid state drives stored in the bay, wherein data communication between the central processing unit and the two or more solid state drives is only performable via the wireless access point.

17. A computer program product, comprising: a computer readable medium having stored thereon computer readable program instructions executable by a processor of a computer system to:
establish, by the processor, a direct wireless connection between a wireless access point and a solid state drive; and
transfer, by the processor, data wirelessly from the wireless access point directly to a solid state drive controller within the solid state drive via the direct wireless connection between the wireless access point and the solid state drive,
wherein the wireless access point is physically electrically coupled to a central processing unit,
wherein the wireless access point is physically electrically coupled to a controller,
wherein the solid state drive is stored in a bay,
wherein the wireless access point and the central processing unit are physically coupled to a common enclosure, wherein the enclosure comprises the bay.

18. The computer program product as recited in claim 17, wherein the data received from the central processing unit is transferred by the wireless access point to the solid state drive stored in the bay without using a physical connection that connects the wireless access point and the solid state drive.

19. The computer program product as recited in claim 17, wherein the computer readable program instructions are executable by the processor of the computer system to:
monitor, by the processor, a bit error rate of the wireless access point;
terminate, by the processor, the wireless connection in response to determining that the bit error rate of the wireless access point is in a range;
establish, by the processor, a second wireless connection between a second wireless access point and the solid state drive; and
transfer, by the processor, data wirelessly from the second wireless access point to the solid state drive,
wherein data communication between the central processing unit and the solid state drive is only performable via the wireless access point.

20. The computer program product as recited in claim 17, wherein the wireless access point is configured to wirelessly transfer data to at least two solid state drives stored in the bay, wherein the enclosure includes a physical electrical connection which connects the controller and the at least one solid state drive, wherein the controller is operable to:
monitor a bit error rate of the wireless access point;
terminate the wireless connection in response to determining that the bit error rate of the wireless access point is in a range;
establish a second wireless connection between a second wireless access point in the computer and the at least one solid state drive in response to determining that the bit error rate is in a range; and
transfer data wirelessly from the second wireless access point to the at least one solid state drive,
wherein establishing the second wireless connection between the second wireless access point in the computer and the at least one solid state drive includes assigning a new static Internet protocol address to the second wireless access point.

\* \* \* \* \*